United States Patent
Lee (10) Patent No.: US 8,692,400 B2
(45) Date of Patent: Apr. 8, 2014

(54) ROTATING ELECTRICAL MACHINE ABNORMAL STATE DETECTION METHOD AND APPARATUS AND WIND DRIVEN GENERATING SYSTEM USING THE SAME

(75) Inventor: Chun-Yao Lee, Kaohsiung (TW)

(73) Assignee: Chung Yuan Christian University, Jhongli (TW)

( * ) Notice: Subject to any disclaimer, the term of this patent is extended or adjusted under 35 U.S.C. 154(b) by 388 days.

(21) Appl. No.: 13/301,284

(22) Filed: Nov. 21, 2011

(65) Prior Publication Data

US 2012/0262131 A1    Oct. 18, 2012

(30) Foreign Application Priority Data

Apr. 14, 2011    (TW) ............................. 100112925 A (51) Int. Cl.
*H02P 9/04*    (2006.01)
(52) U.S. Cl.
USPC ............................................. 290/44; 322/37
(58) Field of Classification Search
USPC ................... 290/43, 44; 322/29, 36, 37, 99
See application file for complete search history.

(56) References Cited

U.S. PATENT DOCUMENTS

| | | | | |
|---|---|---|---|---|
| 5,652,485 | A * | 7/1997 | Spiegel et al. | 318/147 |
| 7,417,333 | B2 * | 8/2008 | Miller et al. | 290/44 |
| 7,839,008 | B2 * | 11/2010 | Woldmann et al. | 290/44 |
| 7,952,214 | B2 * | 5/2011 | Ichinose et al. | 290/44 |
| 7,969,032 | B2 * | 6/2011 | Shinya et al. | 290/44 |
| 8,030,791 | B2 * | 10/2011 | Lang et al. | 290/44 |
| 8,097,971 | B2 * | 1/2012 | Ichinose et al. | 290/44 |
| 8,350,397 | B2 * | 1/2013 | Lang et al. | 290/44 |
| 8,466,573 | B2 * | 6/2013 | Kikuchi et al. | 290/44 |

* cited by examiner

*Primary Examiner* — Nicholas Ponomarenko
(74) *Attorney, Agent, or Firm* — Wang Law Firm, Inc.; Li K. Wang; Stephen Hsu (57) ABSTRACT

A rotating electrical machine abnormal state detection apparatus is provided. The apparatus includes: a current signal acquisition unit, coupled to a rotating electrical machine, for acquiring a set of real-time current waveforms from the rotating electrical machine; a state characteristic database, pre-storing a plurality of abnormal state characteristics which respectively correspond to a plurality of abnormal states; and an abnormal state detection unit, coupled to the current signal acquisition unit and the state characteristic database, for performing signal analysis on the set of real-time current waveforms to produce a current state characteristic, and comparing the current state characteristic with the abnormal state characteristics pre-stored in the state characteristic database to determine the abnormal state of the rotating electrical machine.

26 Claims, 5 Drawing Sheets

ROTATING ELECTRICAL MACHINE ABNORMAL STATE DETECTION METHOD AND APPARATUS AND WIND DRIVEN GENERATING SYSTEM USING THE SAME

CROSS REFERENCE TO RELATED APPLICATIONS

This Non-provisional application claims priority to Patent Application No(s). 100112925, filed in Taiwan, Republic of China on Apr. 14, 2011, the entire contents of which are hereby incorporated by reference.

BACKGROUND OF THE INVENTION

1. Field of the Invention

The present invention relates to methods and an apparatus for detecting an abnormal state of a rotating electrical machine, and in particular relates to methods and an apparatus for detecting an abnormal state of a rotating electrical machine by performing current signal analysis.

2. Description of the Related Art

The components of a rotating electrical machine (including generators and motors) may develop defects due to various reasons such as aging or external factors. The defects may not immediately influence the general operation of the rotating electrical machine, but, if not inspected and replaced, the rotating electrical machine may finally break down, thus increasing maintenance cost or destroying of the rotating electrical machine.

Conventionally, the rotating electrical machine is periodically inspected and maintained to reduce the probability for damage caused by the rotating electrical machine breaking down, which is troublesome. Sometimes, shock sensors and temperatures sensors are used in the prior art to monitor rotating electrical machines for abnormal shocks or temperatures. However, additional measuring instruments are required, such as an accelerometer. The additional measuring instruments not only increase manufacturing cost but may also malfunction due to demagnetizetion, displacement or ageing.

Therefore, a lost cost method and apparatus which can easily detect an abnormal state of a rotating electrical machine and provide an early warning for possible malfunction of the rotating electrical machine is needed.

BRIEF SUMMARY OF THE INVENTION

The present invention provides a rotating electrical machine abnormal state detection apparatus. The apparatus comprises: a current signal acquisition unit, coupled to a rotating electrical machine, for acquiring a set of real-time current waveforms from the rotating electrical machine; a state characteristic database, pre-storing a plurality of abnormal state characteristics which respectively correspond to a plurality of abnormal states; and an abnormal state detection unit, coupled to the current signal acquisition unit and the state characteristic database, for performing signal analysis on the set of real-time current waveforms to produce a current state characteristic, and comparing the current state characteristic with the abnormal state characteristics pre-stored in the state characteristic database to determine the abnormal state of the rotating electrical machine.

The present invention also provides a wind driven generating system, which has abnormal state detection function. The wind driven generating system comprises: a wind driven generator, driven by wind and outputting power; a current signal acquisition unit, coupled to the wind driven generator, for acquiring a set of real-time current waveforms of the power; a state characteristic database, pre-storing a plurality of abnormal state characteristics which correspond to a plurality of abnormal states; and an abnormal state detection unit, coupled to the current signal acquisition unit and the state characteristic database, for performing signal analysis on the real-time current waveforms to produce a current state characteristic, and comparing the current state characteristic with the abnormal state characteristics pre-stored in the state characteristic database to determine the abnormal state of the wind driven generator.

The present invention also provides a rotating electrical machine abnormal state detection method. The method comprises steps of: acquiring a set of real-time current waveforms from the rotating electrical machine; performing signal analysis on the set of real-time current waveforms to produce a current state characteristic; and comparing the current state characteristic with a plurality of abnormal state characteristics to determine the abnormal state of the rotating electrical machine.

The present invention also provides a rotating electrical machine state characteristic database establishing method. The method comprises: causing a rotating electrical machine to be in an abnormal state; driving the rotating electrical machine; acquiring a plurality of sample current waveforms from the rotating electrical machine when in the abnormal state; performing signal analysis one the sample current waveforms to obtain the abnormal state characteristics which correspond to the abnormal state; and storing the abnormal state characteristics of the abnormal state in a state characteristic database. A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention provides an apparatus and method for detecting whether a rotating electrical machine is operating in an abnormal state by using a current signal analysis technique. As commonly defined in the art, the rotating electrical machine of the present invention includes any generator which converts mechanical energy into electrical energy, and any motor which converts electrical energy into mechanical energy. The difference between the prior art and the present invention is that the present invention can determine if an operational rotating electrical machine is in an abnormal state by performing signal analysis on the current waveforms from the operational rotating electrical machine rather than using any known vibration detector or temperature detector. The present invention can provide an early warning for possible defects of the rotating electrical machine without using complicated and costly detection instruments.

Note that, in the present invention, the abnormal state is defined as any state that is different from the normal operating state of the rotating electrical machine. Also, a rotating electrical machine in an abnormal state does not mean that it will immediately malfunction. Additionally, a rotating electrical machine in an abnormal state should be repaired as soon as possible due to possible break down. The abnormal state, such as mechanical or electrical abnormalities, may result from the defects of components of the rotating electrical machine, such as, for example, axle center displacement, wear of bearings (including inner and outer ring), loosening of the machine base, or breakage of an electrical brush or iron core. In addition, the defects may be caused by various predicted or unpredicted external forces. Those skilled in the art can appreciate that the present invention can be used for various kinds of abnormal states which result from various reasons.

Various embodiments of the apparatus and methods of the present invention will be described in detail in the following.

<Rotating Electrical Machine Abnormal State Detection Apparatus>

Figure 1:
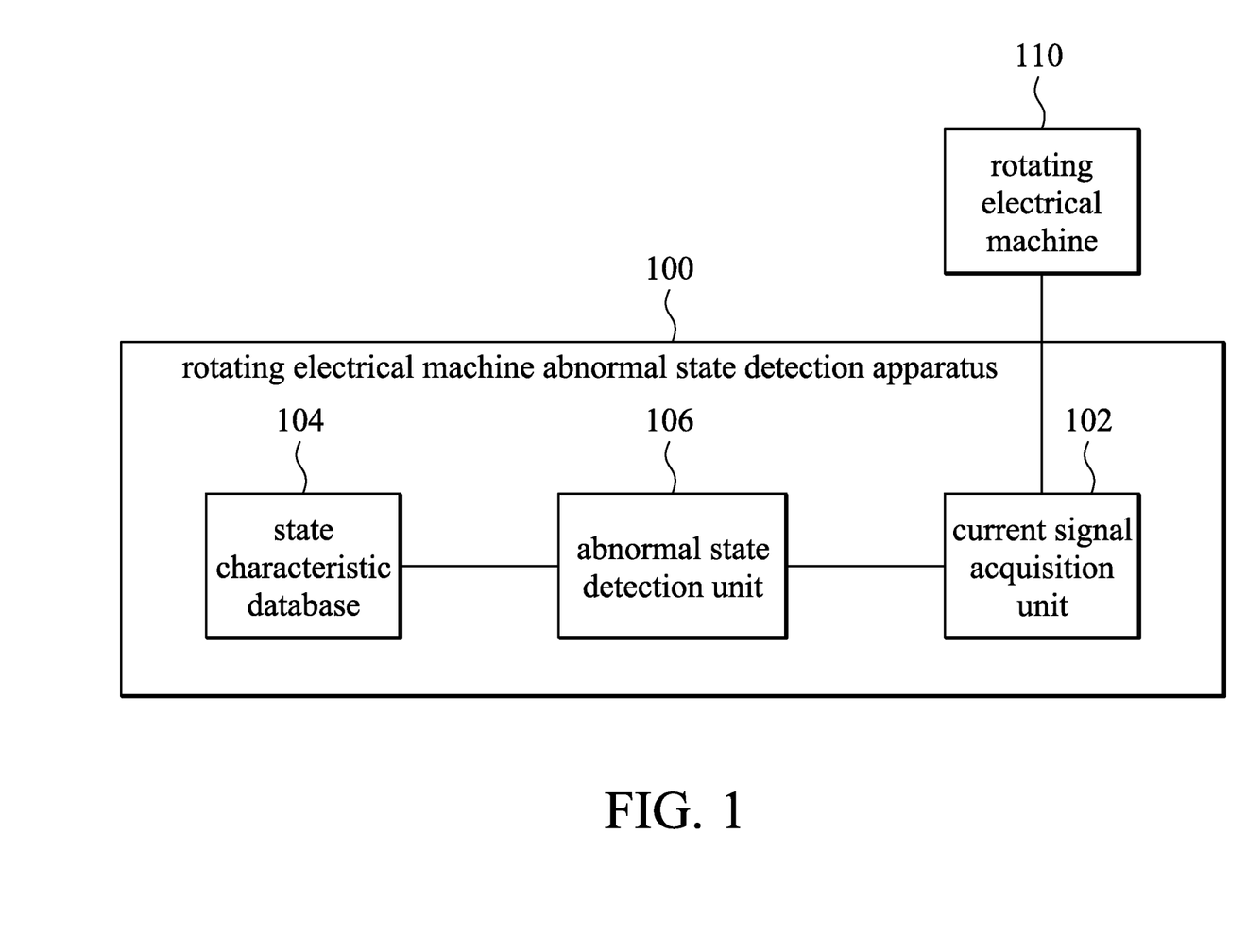
FIG. 1 is a schematic diagram of the rotating electrical machine abnormal state detection apparatus according to an embodiment of the present invention.

FIG. 1 is a schematic diagram of the rotating electrical machine abnormal state detection apparatus according to an embodiment of the present invention. The rotating electrical machine abnormal state detection apparatus 100 of the present invention comprises a current signal acquisition unit 102, a state characteristic database 104 and an abnormal state detection unit 106. The current signal acquisition unit 102 is coupled to a rotating electrical machine 110, and the abnormal state detection unit 106 is coupled to the current signal acquisition unit 102 and the state characteristic database 104.

The current signal acquisition unit 102 of the present invention is used to acquire a set of real-time current waveforms of the rotating electrical machine 110 when the rotating electrical machine 110 is operating. Note that, when the rotating electrical machine 110 is a generator, the real-time current waveforms should be the "output" current waveforms on the coil winding of the operational generator, and, when the rotating electrical machine 110 is a motor, the real-time current waveforms should be the "input" current waveforms on the coil winding of the operational motor, where the coil winding draws the current from the power supply. No matter what kind of defects are occurring in the rotating electrical machine, the input or output currents of the rotating electrical machine are influenced to some degree. Therefore, by inspecting the current waveforms, the present invention can easily determine whether the rotating electrical machine is in an abnormal state.

The state characteristic database 104 of the present invention is used to pre-store various state characteristics of various states (including a normal state or breakdown state). The stored state characteristics in particular include the abnormal state characteristics which respectively correspond to various abnormal states. The abnormal state characteristics are stored in a form which is in accordance with that the state detection unit 106 uses when performing the signal analysis method. The state detection unit 106 and the signal analysis it performs will be discussed later.

For illustration, the state detection unit 106 of the present invention has two functions: Function 1—establishing the data related to the abnormal state (i.e., "abnormal state characteristics") in the state characteristic database 104 before examining the rotating electrical machine; and Function 2—determining, synchronously, whether the abnormal state occurs when the rotating electrical machine is operational.

In Function 1, the abnormal state detection unit 106 performs signal analysis, in advance, on a plurality of sample current waveforms produced in the rotating electrical machine 110 when in the abnormal state (for example, axle center displacement, or wear of the bearing) to obtain the abnormal state characteristics which correspond to the abnormal state.

Figure 2:
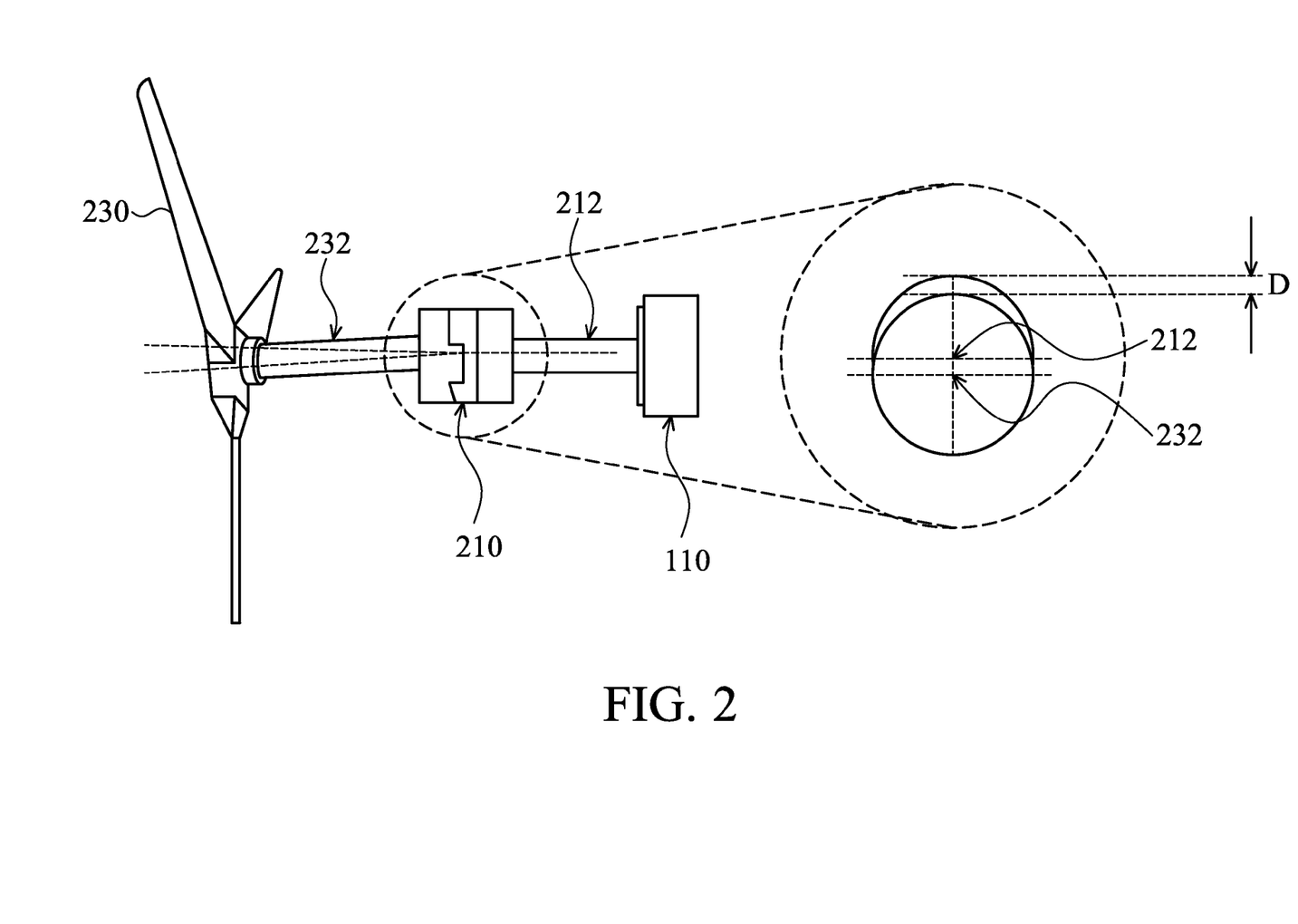
FIG. 2 is a schematic diagram of a wind driven generator.

FIG. 2 is a schematic diagram of a wind driven generator. FIG. 2 illustrates how the abnormal state detection unit 106 of the present invention produces the abnormal state characteristics of the abnormal state when the rotating electrical machine is a wind driven generator 210. In this embodiment, the abnormal state characteristics to be established are related to the defects which results from the displacement of the axis center. The wind driven generator 210 has an axis 212 which is coupled to a center 232 of a fan 230, where the wind drives the fan 230 and then drives the generator 210. For inspecting the relationship between the off-center displacement and the output current of the generator 210, the axis 212 of the generator 210 may be made, in advance, to be off center from the center 232 by a displacement D (displacement D may be respectively 0 mm, 1.0 mm, 1.5 mm, 2.0 mm and 2.5 mm in establishing five data groups), and then, after the wind drives the generator 210, signal analysis may be performed on the current waveforms (i.e., the said "sample current waveforms") which respectively correspond to displacements in each data group. In this embodiment, the state where "displacement is 0 mm" is regarded as the normal state, while the other states where "displacement is not 0 mm" are regarded as the abnormal states. When the abnormal state detection unit 106 of the present invention performs signal analysis on the sample current waveforms of the four data groups where "displacement is not 0 mm", the acquired characteristics are the said "abnormal state characteristics". Note that, in a better embodiment, to acquire the state characteristics, the fan 230 can be replaced by a motor for providing stable and controllable driving power instead of the unstable wind power.

Similarly, in other embodiments, if the abnormal state characteristics to be established is related to the defects of the inner components of the rotating electrical machine, such as wear of the inner or outer ring bearing, the original bearing inner or outer ring bearing may be replaced with a defective inner or outer ring bearing for obtaining the abnormal state characteristics of this kind of abnormal state after performance of the signal analysis by the abnormal state detection unit 106. In some embodiments, for acquiring the state characteristics, the original rotating electrical machine can be replaced by a defective rotating electrical machine with the same specification and type. The abnormal state characteristics may be stored in the state characteristic database 104.

When the "abnormal state characteristics" of the "abnormal state" are all established, the rotating electrical machine should return to the normal state. When the rotating electrical machine 110 is operating (for example, a wind driven generator generates power), the abnormal state detection unit 106 of the present invention runs the function 2, i.e., performing the signal analysis on the real-time current waveforms acquired from the rotating electrical machine 110 by the current signal acquisition unit 102, in order to produce a current state characteristic. Then, the abnormal state detection unit 106 further compares the current state characteristic with the abnormal state characteristics to determine the abnormal state of the rotating electrical machine. Alternatively, in some embodiments, the state characteristic database 104 may merely pre-store a "normal state characteristic" which corresponds to a "normal state", and when the current state characteristic is different from the "normal state characteristic", the rotating electrical machine would be regarded as being in some kind of abnormal state. In a better embodiment, the apparatus 100 of the present invention may additionally configure an alarm to indicate the abnormal state of the rotating electrical machine 110, or an automatic controller to control the rotating electrical machine to perform another operation such as shutting down of the rotating electrical machine. The additional alarm or automatic controller can help engineers in planning for when they inspect and repair the rotating electrical machine and prevent the machine from entirely breaking down.

Figure 3A:
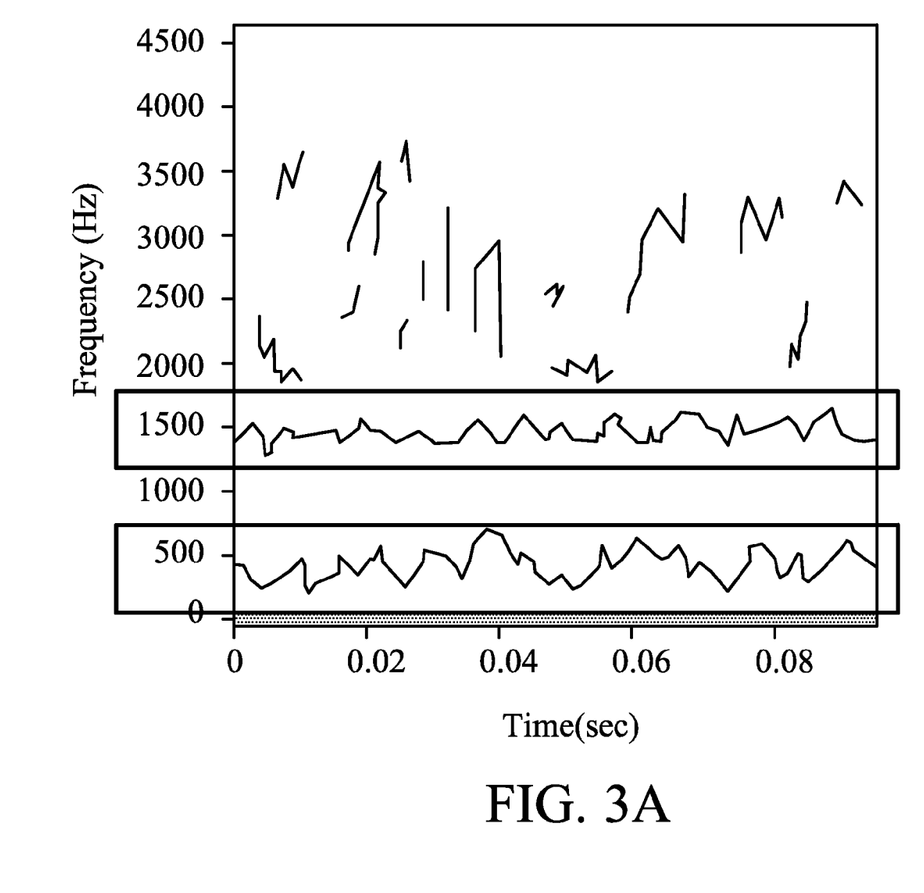
FIG. 3A is the frequency spectrum of the current of the rotating electrical machine in a normal state.
Figure 3B:
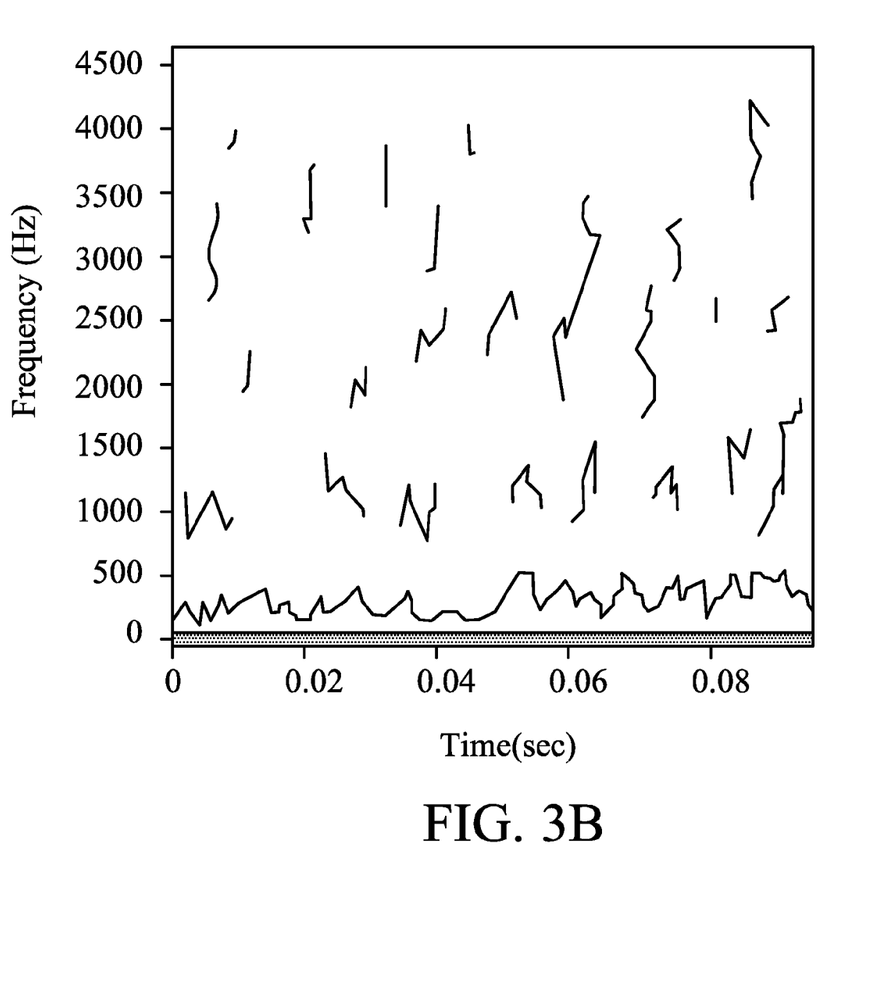
FIG. 3B is the frequency spectrum of the current of the rotating electrical machine when in an abnormal state where the axle of the rotating electrical machine is off center by 1.0 mm.

In the embodiments described above, the abnormal state detection unit 106 of the present invention performs signal analysis on the acquired sample current waveforms and the real-time current waveforms, where the signal analysis comprises frequency domain analysis. Since the differences between current waveforms are usually not obvious in the time domain, the present invention performs frequency domain analysis on the acquired current waveforms to clarify any differences. The frequency domain analysis method further comprises a wavelet transform, Fourier transform or Hilbert Huang transform. FIG. 3A is the frequency spectrum of the current of the rotating electrical machine in a normal state, and FIG. 3B is the frequency spectrum of the current of the rotating electrical machine when in an abnormal state where the axle of the rotating electrical machine is off center by 1.0 mm. In FIG. 3A, the current signals appear mostly at the frequency banks of 500 Hz and 1,500 Hz, but in FIG. 3B, the current signals are mostly spread out in a random manner and some appear at the frequency banks of 500 Hz. In brief, performing the frequency domain analysis on the current signal is good for determining, in a visualized way, how an abnormal state influences the current signal. When influences of the abnormal state to the signals are reproduced, the abnormal state characteristics of the abnormal state can be determined and then stored in the state characteristic database 104 so that the apparatus of the present invention can compare the current state characteristic acquired in real-time with the abnormal state characteristics stored in the state characteristic database 104 for automatic inspection.

The rotating electrical machine abnormal state detection apparatus of the present invention has been described above in detail. In addition, the present invention further provides a wind driven generating system which has the abnormal state detection function.

<Wind Driven Generating System Having the Abnormal State Detection Function>

Please refer to FIGS. 1 and 2, the wind driven generating system of the present invention has at least one wind driven generator 210 for being driven by wind and outputting power. Different from the prior art, the wind driven generating system of the present invention has a self-abnormal state detection function. The wind driven generating system comprises the current signal acquisition unit 102, the state characteristic database 104 and the abnormal state detection unit 106 as shown in FIG. 1 to perform self-abnormal state detection. Since all of the components of the wind driven generating system of the present invention has been described previously, the embodiments of the wind driven generating system will not be further discussed.

Due to the abnormal state detection function, the wind driven generating system of the present invention can reduce the possibility that a defect will suddenly destroy the entire wind driven generating system, thus preventing expensive maintenance costs and extending the life of the wind driven generating system.

The present invention further provides a rotating electrical machine state characteristic database establishing method and a rotating electrical machine abnormal state detection method as follows.

<Rotating Electrical Machine State Characteristic Database Establishing Method>

Figure 4:
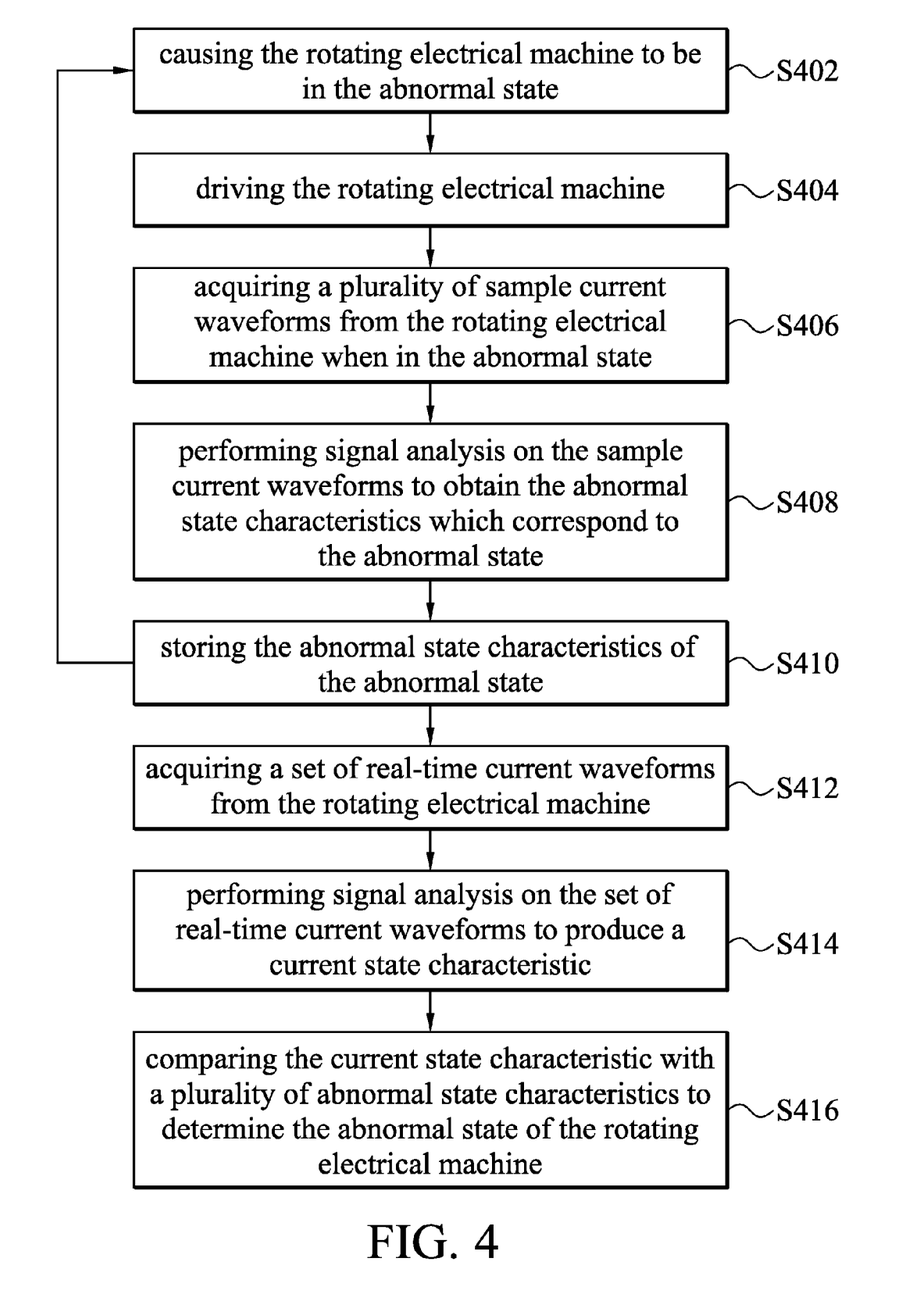
FIG. 4 is a flowchart of the combination of the rotating electrical machine state characteristic database establishing method and the abnormal state detection method.

FIG. 4 is a flowchart of the combination of the rotating electrical machine state characteristic database establishing method and the abnormal state detection method. Please refer to FIGS. 1 and 4 for illustration. The rotating electrical machine state characteristic database establishing method of the present invention are shown in the steps S402~S410 of FIG. 4. In step S402, the rotating electrical machine 110 is forced to be in an abnormal state. For example, in an embodiment, the axle of the rotating electrical machine is forced to be off center by a displacement, or in another embodiment, the components (e.g., the inner or outer ring of the bearing) of the original machine is replaced by other defective components; or in yet another embodiment, the original rotating electrical machine is replaced by a defective rotating electrical machine with the same specification and type. The rotating electrical machine state characteristic database establishing method of the present invention further comprises: the step S404 of driving the rotating electrical machine, for example, by supplying any powers; the step S406 of acquiring a plurality of sample current waveforms from the rotating electrical machine when in the abnormal state, for example, by the current signal acquisition unit 102 of the present invention; the step S408 of performing signal analysis on the sample current waveforms to obtain the abnormal state characteristics which correspond to the abnormal state, for example, by the abnormal state detection unit 106 of the present invention; and the step S410 of storing the abnormal state characteristics of the abnormal state, for example, in the state characteristic database 104 of the present invention. Note that when the rotating electrical machine 110 is a generator, the sample current waveforms obtained in step S406 are the values of the "output" currents of the coil winding of the generator, and when the rotating electrical machine 110 is a motor, the sample current waveforms obtained in step S406 are the values of the "input" currents of the motor which draws current from the power supply. After step S410 is done, the steps S402~S410 are repeated to establish the abnormal state characteristics which correspond to other abnormal states.

<Rotating Electrical Machine Abnormal State Detection Method>

After the state characteristic of the normal of the abnormal state are established, the rotating electrical machine 110 should be returned to be in the normal state. When the rotating electrical machine 110 is operational, the rotating electrical machine abnormal state detection method further proceeds to the following steps: step S412 of acquiring the real-time current waveforms of the rotating electrical machine, for example, by the current signal acquisition unit 102; step S414 of performing signal analysis on the real-time current waveforms to obtain a current state characteristic, for example, by the abnormal state detection unit 104; and step S416 of comparing the current state characteristic with the abnormal state characteristics of the abnormal state to determine the abnormal state of the rotating electrical machine, for example, by the abnormal state detection unit 104. Similarly, when the rotating electrical machine 110 is a generator, the real-time current waveforms acquired in step S412 are the values of the "output" currents of the coil winding of the generator, and when the rotating electrical machine 110 is a motor, the real-time current waveforms acquired in step S412 are the values of the "input" currents of the motor which draws currents from the power supply. In addition, "signal analysis" comprises time domain analysis and frequency domain analysis. In a better embodiment, the present invention can use a general or a special frequency domain analysis to make the differences of the current waveforms between the normal state and the abnormal state more obvious.

Since each step of the rotating electrical machine state characteristic database establishing method and the rotating electrical machine abnormal state detection method can be performed by the components of the rotating electrical machine abnormal state detection apparatus of the present invention, the embodiments of the methods of the present invention will not be further discussed for brevity.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rotating electrical machine abnormal state detection apparatus, comprising:
   a current signal acquisition unit, coupled to a rotating electrical machine, for acquiring a set of real-time current waveforms from the rotating electrical machine;
   a state characteristic database, pre-storing a plurality of abnormal state characteristics which respectively correspond to a plurality of abnormal states; and
   an abnormal state detection unit, coupled to the current signal acquisition unit and the state characteristic database, for performing signal analysis on the set of real-time current waveforms to produce a current state characteristic, and comparing the current state characteristic with the abnormal state characteristics pre-stored in the state characteristic database to determine the abnormal state of the rotating electrical machine.

2. The rotating electrical machine abnormal state detection apparatus as claimed in claim 1, wherein, the abnormal state detection unit further performs signal analysis, in advance, on a plurality of sample current waveforms produced in the rotating electrical machine when in the abnormal state to obtain the abnormal state characteristics which correspond to the abnormal state.

3. The rotating electrical machine abnormal state detection apparatus as claimed in claim 1, wherein the signal analysis further comprises frequency domain analysis.

4. The rotating electrical machine abnormal state detection apparatus as claimed in claim 3, wherein the frequency domain analysis is performed by using wavelet transform.

5. The rotating electrical machine abnormal state detection apparatus as claimed in claim 3, wherein the frequency domain analysis is performed by using Fourier transform.

6. The rotating electrical machine abnormal state detection apparatus as claimed in claim 3, wherein the frequency domain analysis is performed by using Hilbert Huang transform.

7. The rotating electrical machine abnormal state detection apparatus as claimed in claim 2, wherein, when the rotating electrical machine is a generator, the real-time current waveforms and the sample current waveforms acquired by the current signal acquisition unit are the values of the output currents of the generator.

8. The rotating electrical machine abnormal state detection apparatus as claimed in claim 2, wherein, when the rotating electrical machine is a motor, the real-time current waveforms and the sample current waveforms acquired by the current signal acquisition unit are the values of the input currents of the motor.

9. A wind driven generating system, having abnormal state detection function, comprising:
   a wind driven generator, driven by wind and outputting power;
   a current signal acquisition unit, coupled to the wind driven generator, for acquiring a set of real-time current waveforms of the power;
   a state characteristic database, pre-storing a plurality of abnormal state characteristics which correspond to a plurality of abnormal states; and
   an abnormal state detection unit, coupled to the current signal acquisition unit and the state characteristic database, for performing signal analysis on the real-time current waveforms to produce a current state characteristic, and comparing the current state characteristic with the abnormal state characteristics pre-stored in the state characteristic database to determine the abnormal state of the wind driven generator.

10. The wind driven generating system as claimed in claim 9, wherein, the abnormal state detection unit further performs signal analysis, in advance, on a plurality of sample current waveforms produced in the wind driven generator when in the abnormal state to obtain the abnormal state characteristics which correspond to the abnormal state.

11. The wind driven generating system as claimed in claim 9, wherein the signal analysis further comprises frequency domain analysis.

12. The wind driven generating system as claimed in claim 11, wherein the frequency domain analysis is performed by using wavelet transform.

13. The wind driven generating system as claimed in claim 11, wherein the frequency domain analysis is performed by using Fourier transform.

14. The wind driven generating system as claimed in claim 11, wherein the frequency domain analysis is performed by using Hilbert Huang transform.

15. The wind driven generating system as claimed in claim 10, wherein, when the rotating electrical machine is a generator, the real-time current waveforms and the sample current waveforms acquired by the current signal acquisition unit are the values of the output currents of the generator.

16. The wind driven generating system as claimed in claim 10, wherein, when the rotating electrical machine is a motor, the real-time current waveforms and the sample current waveforms acquired by the current signal acquisition unit are the values of the input currents of the motor.

17. A rotating electrical machine abnormal state detection method, comprising steps of:
   acquiring a set of real-time current waveforms from the rotating electrical machine;
   performing signal analysis on the set of real-time current waveforms to produce a current state characteristic; and
   comparing the current state characteristic with a plurality of abnormal state characteristics to determine the abnormal state of the rotating electrical machine.

18. The rotating electrical machine abnormal state detection method as claimed in claim 17, further comprising a step of establishing a state characteristic database for pre-storing the abnormal state characteristics.

19. The rotating electrical machine abnormal state detection method as claimed in claim 18, wherein the step of establishing the state characteristic database further comprises:
   causing the rotating electrical machine to be in the abnormal state;
   driving the rotating electrical machine;
   acquiring a plurality of sample current waveforms from the rotating electrical machine when in the abnormal state;
   performing signal analysis on the sample current waveforms to obtain the abnormal state characteristics which correspond to the abnormal state; and
   storing the abnormal state characteristics of the abnormal state in the state characteristic database.

20. The rotating electrical machine abnormal state detection method as claimed in claim 17, wherein the signal analysis further comprises frequency domain analysis.

21. The rotating electrical machine abnormal state detection method as claimed in claim 20, wherein the frequency domain analysis is performed by using wavelet transform.

22. The rotating electrical machine abnormal state detection method as claimed in claim 20, wherein the frequency domain analysis is performed by using Fourier transform.

23. The rotating electrical machine abnormal state detection method as claimed in claim 20, wherein the frequency domain analysis is performed by using Hilbert Huang transform.

24. The rotating electrical machine abnormal state detection method as claimed in claim 19, wherein, when the rotating electrical machine is a generator, the real-time current waveforms and the sample current waveforms acquired by the current signal acquisition unit are the values of the output currents of the generator.

25. The rotating electrical machine abnormal state detection method as claimed in claim 19, wherein, when the rotating electrical machine is a motor, the real-time current waveforms and the sample current waveforms acquired by the current signal acquisition unit are the values of the input currents of the motor.

26. A rotating electrical machine state characteristic database establishing method, comprising:
   causing a rotating electrical machine to be in an abnormal state;
   driving the rotating electrical machine;
   acquiring a plurality of sample current waveforms from the rotating electrical machine when in the abnormal state;
   performing signal analysis one the sample current waveforms to obtain the abnormal state characteristics which correspond to the abnormal state; and
   storing the abnormal state characteristics of the abnormal state in a state characteristic database.

\* \* \* \* \*